US010527484B2

(12) United States Patent
Bottomly

(10) Patent No.: US 10,527,484 B2
(45) Date of Patent: Jan. 7, 2020

(54) SMART DIAPER CHANGING PAD

(71) Applicant: Braven LC, Orem, UT (US)

(72) Inventor: Matthew David Bottomly, Ladera Ranch, CA (US)

(*) Notice: Subject to any disclaimer, the term of this patent is extended or adjusted under 35 U.S.C. 154(b) by 108 days.

(21) Appl. No.: 15/825,008

(22) Filed: Nov. 28, 2017

(65) Prior Publication Data

US 2018/0106664 A1  Apr. 19, 2018

Related U.S. Application Data

(63) Continuation of application No. PCT/US2016/035121, filed on May 31, 2016.

(Continued)

(51) Int. Cl.
*A47D 5/00* (2006.01)
*G01G 19/415* (2006.01)
(Continued)

(52) U.S. Cl.
CPC ............ *G01G 19/44* (2013.01); *A47D 5/00* (2013.01); *G01G 19/415* (2013.01); *G01G 19/52* (2013.01)

(58) Field of Classification Search
CPC ......... G01G 19/44; G01G 19/415; A47D 5/00
(Continued)

(56) References Cited

U.S. PATENT DOCUMENTS 6,409,654 B1 * 6/2002 McClain ................ A61G 11/00
600/22

8,599,025 B2 * 12/2013 Cipriano .............. G01G 19/445
177/25.19
(Continued)

FOREIGN PATENT DOCUMENTS

CN 201410260309 * 6/2014
DE 202006008869 U1 8/2006
WO WO 2019009571 * 1/2019

OTHER PUBLICATIONS https://www.youtube.com/watch?v=6PM, Published on Dec. 12, 2013 Service Manual for seca 717A, 717 Japan, seca 757—wireless baby scale with optimized damping system—seca1840, Data sheet of price list entitled Medical measuring systems and scales, 2013.*
(Continued)

*Primary Examiner* — Jacques M Saint Surin
(74) *Attorney, Agent, or Firm* — West Coast IP, P.C.

(57) ABSTRACT

The present invention relates to a smart diaper changing pad for weighing an infant or toddler and communicating the recorded information wirelessly to a mobile computer. The diaper changing pad incorporates force or mass sensors for measuring weight. The changing and cleaning pad and a separate computing system are wirelessly connected, either directly or through a network capable of both internal and external communication. An application installed on the mobile computer can track measurements from the diaper changing pad and keep a historical record, which may provide peace of mind and insight into a baby's health and development. The key components of the product are a soft pad, a rigid platform, one or more sensors capable of measuring force or weight, a power source, a memory, a processor, and a wireless communication method. The invention can optionally include a display and a number of user inputs such as buttons or switches.

20 Claims, 9 Drawing Sheets

Related U.S. Application Data

(60) Provisional application No. 62/167,874, filed on May 28, 2015.

(51) Int. Cl.
   *G01G 19/52* (2006.01)
   *G01G 19/44* (2006.01)

(58) Field of Classification Search
   USPC .......................................................... 177/3
   See application file for complete search history.

(56) References Cited

U.S. PATENT DOCUMENTS

| | | | |
|---|---|---|---|
| 8,822,847 B2 | 2/2014 | Vidal et al. | |
| 9,433,357 B2* | 9/2016 | Yuen | G06F 19/3418 |
| 2007/0246992 A1* | 10/2007 | Allseits | A47C 7/02 |
| | | | 297/452.12 |
| 2010/0089665 A1* | 4/2010 | Tanaka | G01G 19/44 |
| | | | 177/25.12 |
| 2010/0242182 A1* | 9/2010 | Chuang | A47D 15/001 |
| | | | 5/655 |
| 2014/0121473 A1* | 5/2014 | Banet | A61B 5/6808 |
| | | | 600/301 |
| 2016/0069734 A1* | 3/2016 | Harry, Jr. | G01G 19/445 |
| | | | 177/1 |
| 2016/0069735 A1* | 3/2016 | Underwood | G01G 19/445 |
| | | | 177/1 |
| 2018/0080810 A1 | 3/2018 | Weiss et al. | |

OTHER PUBLICATIONS

Wireless Baby Scale 757, Seca, 2013.*
PCT International Search Report, dated Feb. 8, 2017, World Intellectual Property Office.
Service Manual for seca 717A, 717 Japan, 757. Datasheet [online]. Seca, 2014 [retrieved on Jan. 25, 2017]. Retrieved from the Internet: <URL: https://web.archive.org/web/20140809044656/http://www.frankshospitalworkshop.com/equipment/documents/light/service_manuals/Seca_717_757_-_Service_manual.pdf>.
Seca 757—wireless baby scale with optimized damping system—seca 1840. YouTube [online]. Seca, 2013 [retrieved on Feb. 25, 2017]. Retrieved from the Internet: <URL: https://www.youtube.com/watch?v=6PMjRp1PTG8>.
Medical Measuring Systems and Scales since 1840. Datasheet [online]. Seca, 2014 [retrieved on Jan. 25, 2017]. Retrieved from the internet: <URL: http:pdfs.findtheneedle.co.uk/23134.pdf>.
Shu, Catherin. 'Hatch Baby, Maker of Smart Products for New Parents, Raises $7M Series A From True Ventures'. In TechCrunch [online]. Oct. 15, 2015 [retrieved on Jan. 25, 2017]. Retrieved from the Internet: <URL: https://techcrunch.com/2015/10/15/hatch-baby/>.
Written Opinion of the International Searching Authority, dated Feb. 8, 2017, World Intellectual Property Office.

* cited by examiner

SMART DIAPER CHANGING PAD

CROSS-REFERENCE TO RELATED APPLICATIONS

The present application is a continuation of and claims the benefit of priority to PCT Patent Application No. PCT/US16/35121 titled "SMART DIAPER CHANGING PAD" and filed May 31, 2016, which claims the benefit of priority to U.S. Provisional Application No. 62/167,874, titled "SMART DIAPER CHANGING PAD" and filed May 28, 2015, both of which are incorporated herein by reference in their entirety and are to be considered parts of the specification.

FIELD OF THE INVENTION

The present invention relates generally to baby products and nursery accessories. More particularly, embodiments include a weight scale incorporated into a diaper changing and cleaning pad for babies and young children. More particularly embodiments include an electronic weight scale capable of wireless communication incorporated into a diaper changing and cleaning pad for babies and young children.

DESCRIPTION OF THE RELATED ART

There are many different blankets, changing pads, and cleaning pads on the market to protect furniture and floors from diaper contents and to keep a baby from rolling off of the changing surface and hurting himself or herself. A changing pad is typically an elongated, soft cushion covered in a water resistant or waterproof material so that a baby has a comfortable place to safely rest while a parent removes a baby's diaper, cleans the baby, and applies a fresh diaper. Many changing pads have elevated edges along the long sides to keep a baby from rolling off the pad and getting hurt. Changing pads frequently include a safety belt, vest-like restraint, or swaddle restraint to further reduce the chances of a baby rolling or falling off of the changing pad.

Many changing tables, changing dressers, and other pieces of nursery furniture include a standard-dimension raised frame built to securely hold a changing pad on the furniture piece's top surface. Changing pads also often include slip-resistant feet and a leash of material that can be anchored to a dresser, changing table, or other piece of furniture with a nail, tack, or snap. The changing pad leash, the slip-resistant feet, and the nursery furniture frame are intended to secure the baby changing pad so the pad will not tip off of the furniture as a baby adjusts position. In other circumstances changing pad have been specifically designed to stably rest on or latch on to the top of a crib or car seat.

In addition to changing pads, changing pad covers are a popular accessory. Changing pads are typically covered in vinyl which is easy to clean but can be cold and clammy to the touch, making a baby uncomfortable during an already intrusive cleaning process. Changing pad covers are typically plush or fabric covers that stretch over a changing pad and are secured by elastic tension or some other mechanism. Changing pad covers are removable and often machine washable, and they add a layer of cushion, comfort, and warmth for a baby. Changing pad covers are especially recommended during night-time diaper changes in colder climates so that the cold surface will not completely wake up a half-asleep baby.

In a crowded nursery, every horizontal surface becomes valuable storage space and every item must deserve its spot. All changing pads occupy space, but none serve any purpose beyond providing a cleanable surface for diaper changing and baby cleaning. None provide or record any information about the baby or the changing process. In general, changing pads have not changed since the 1920s adoption of vinyl polymers.

In order to address the above-described exemplary problems, and other similar problems, a novel smart diaper changing pad is needed to provide a parent with information regarding a baby's health and growth.

DETAILED DESCRIPTION

Figure 15:
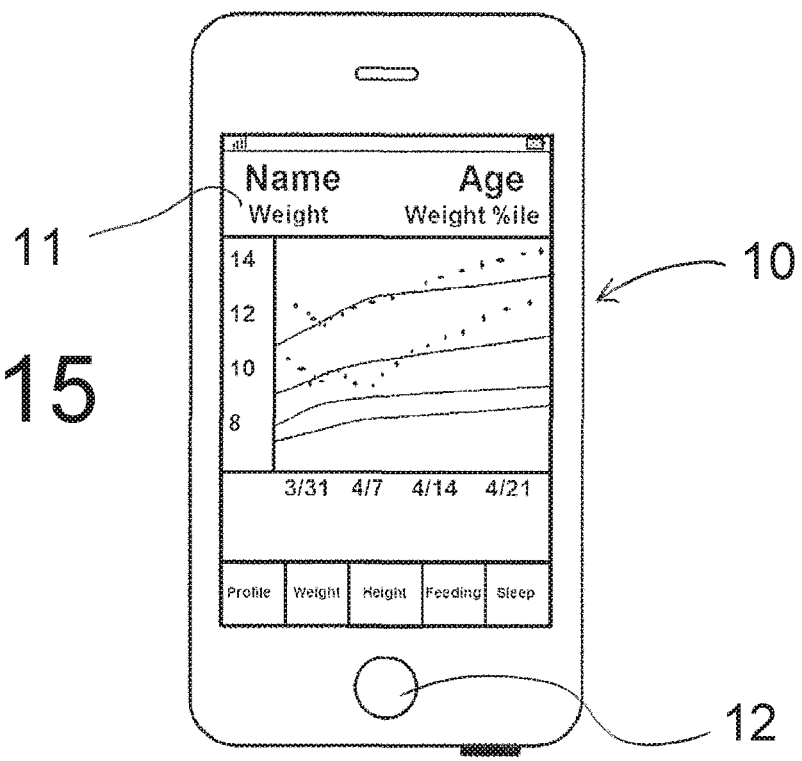
FIG. 15 is a view the baby weight chart screen in the smart diaper changing app as accessed via a separate computing device

Various embodiments disclosed herein relate to a smart diaper changing pad 100 incorporating an electronic scale. The electronic scale element can be incorporated into any shape or type of changing pad 100, including traditional foam or batting changing pads, memory foam changing pads, organic changing pads, and even portable or foldable changing pads. The electronic scale elements can be integral to the changing pad 100 or may be incorporated into a separate platform 105 placed beneath a changing pad. The electronic scale may return weight information visibly, as through a display, through wireless communication to a separate computing device 10 (as shown in FIG. 15), or both. The electronic scale can be as sensitive as technology allows and may use multiple strain gauges or load cells 125 to increase sensitivity and effective measurement range.

In the following detailed description, numerous specific details are set forth in order to provide a thorough understanding of the invention. However, the invention may be practiced without these specific details or in any combination incorporating multiple versions of these details together. In other instances, well known methods, procedures, and/or components have not been described in detail so as not to unnecessarily obscure aspects of the invention.

With respect to FIGS. 1-14, in a first embodiment, a smart diaper changing pad 100 includes a central depression 101 with two elevated edges or sidewalls 102, one on each side. To minimize the absorption of undesirable odors or germs, the outer surface may be comprised of a waterproof or water resistant material such as, but not limited to, vinyl, silicon, nylon, polyester, plastic, leather, treated fabrics or antibacterial materials. The central depression 101 and the elevated walls 102 may be padded so as to be comfortable for a baby and to avoid injury. The interior cushion 106 can be made of any material, including but not limited to, batting, down, cotton, foam, micro-cell foam, memory foam, stuffing, air-filled pockets, or liquid-filled pockets. In one embodiment, the two elevated edges 102 angle up from the central depression 101 and in some embodiments reach a height (h) of three to five (3-5) inches to keep the baby from rolling either direction off of the smart diaper changing pad 100. In one embodiment, the weighing device is between thirty (30) and thirty-six (36) inches long (l) and between twelve (12) and eighteen (18) inches wide (w). In other embodiments, the edges 102 curve up instead of angling up, and the height of the walls 102 may vary in different devices. The smart diaper changing pad 100 may be constructed with different dimensions without departing from the present invention.

Figure 14:
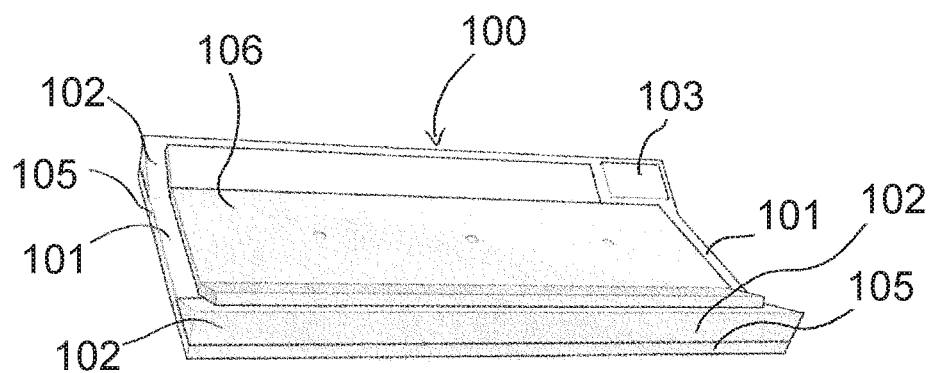
FIG. 14 is an elevated end view of an exemplary smart diaper changing pad with a smart diaper changing pad cushion from the front.

In another embodiment, one variation of which is discussed in greater detail with respect to FIG. 14, the outer surface may instead be supported on a rigid platform 105 or stretched over a wood or metal frame. If the outer surface is suspended over a frame, the central depression 101 is suspended (like a hammock) instead of filled with padding. If there is a hard frame or platform 105, the elements of the frame within reach of a baby should be padded or cushioned 106 beneath the outer material.

As disclosed in FIGS. 6, 7, 8, and 12, in some embodiments, the changing pad 100 includes slip-resistant feet 104. The force or mass sensors 125 may be connected to the legs, feet, or pads 104. In some embodiments with flexible central depression cushion 106, the smart diaper changing pad 100 may require that a rigid element or platform 105 be included near the bottom of the device and the feet 104 are connected directly to the rigid platform 105 so that the flexibility of the softer materials does not negatively impact the sensors' 125 ability to accurately measure mass or force. The feet 104 are attached beneath the rigid platform 105, and the sensor elements 125 associated with each foot 104 may be hidden inside of the outer material of the smart diaper changing pad 100. Additionally the legs or supports 104 for the sensors 125 should be configured to create a stable and slip-free surface for the smart diaper changing pad 100 to avoid injury. As shown in the FIG. 4 feet 104 are shown, but more or fewer feet may be incorporated without departing from the present invention. A sensor 125 should be associated with each foot or point contacting the underlying substrate, but a single sensor 125 could be connected to multiple feet.

In some embodiments, the non-electronic elements of the smart diaper changing pad 100 can be made of organic materials. In these embodiments, the electronic materials can be fully enclosed on the bottom-side of the device to avoid any exposure to the baby. Alternatively the electronic (and other inorganic) elements can be entirely contained in a separate platform that is fully separable from the fully organic baby-supporting elements. In some embodiments, the separate platform comprising the inorganic elements may be the same as the rigid platform 105 and the organic elements may comprise the cushioned elements 106. The platform may be specially designed to pair with the organic baby-supporting elements.

The electrical components in the smart diaper changing pad 100 include at least a mass or force sensor element 125 and an indicator element (e.g., the display 103 or a feedback element 128). The pad 100 may also include other electronic components such as a processor 122, an external communication system 124, a power supply 121, a memory 123, user input controls 126, and other sensors 125 to measure other information about the user or environment.

The mass or force sensor element 125 may detect either force or mass. The downward force of an object is equal to the mass of the object multiplied by the local gravitational field (on the earth's surface, approximately 9.81 meters per second squared). Traditional sensor elements 125 used for detecting either mass or force include strain gauges or load cells 125. Other sensors may also or instead be included. When a force is applied to a material, that material elongates or contracts, which adjusts the electrical parameters across the material. A strain gauge is a transducer that detects that change in electrical parameters (typically either resistance or resistivity) in response to an applied force. Load cells are typically configurations of strain gauges in some sort of bridge configuration, which allows an electronic estimate of the force. One of the most common sensor configurations is a Wheatstone bridge (including half or quarter Wheatstone bridges). An electronic scale may incorporate one or more sensor elements 125. A greater number of sensor elements 125 can increase the effective sensor range and increase the sensitivity within that range. In some cases, the configuration of multiple strain gauges 125 also allows the scale to passively correct for humidity- or temperature-based interference.

With a mass or force sensor 125 incorporated into a diaper changing pad 100, the smart diaper changing pad 100 can passively record a baby's mass or weight each time that the baby's diaper is changed. Depending on age, a baby's diaper may need to be changed as often as a dozen times per day, which provides a number of data points. Parents often own multiple changing pads (especially in multi-story homes), but even parents in modest homes often own a mobile changing pad in addition to a nursery or living room changing pad 100. The mass or force sensor 125 can be incorporated into both stationary and mobile changing pads 100. Multiple smart diaper changing pads 100 could collectively create a comprehensive diaper changing record.

An indicator element allows a user to learn the results of the measurement and may include a display 103, and/or some other sort of visual, auditory, or haptic indicator 128. Common auditory indicators include speakers and buzzers. A speaker may declare the baby's weight or the speaker may simply play comforting tones for the baby during the changing process. The tones could be stored in the smart diaper changing pad 100 or played from a user's mobile computing device 10 or cloud music service. Common haptic indicators convey information through vibration. A haptic indicator might vibrate in a set pattern to tell a parent when a measurement is complete or when any other message is intended for the parent. Alternatively, a haptic indicator could produce a comforting vibration or massage feeling to help relax a baby during a diaper change. Common displays include projectors, LCD (liquid crystal displays) and LED (light-emitting diode) displays. The display 103 can be dimmable so that it will not cast too much light or wake a baby in a darkened room.

Figure 1:
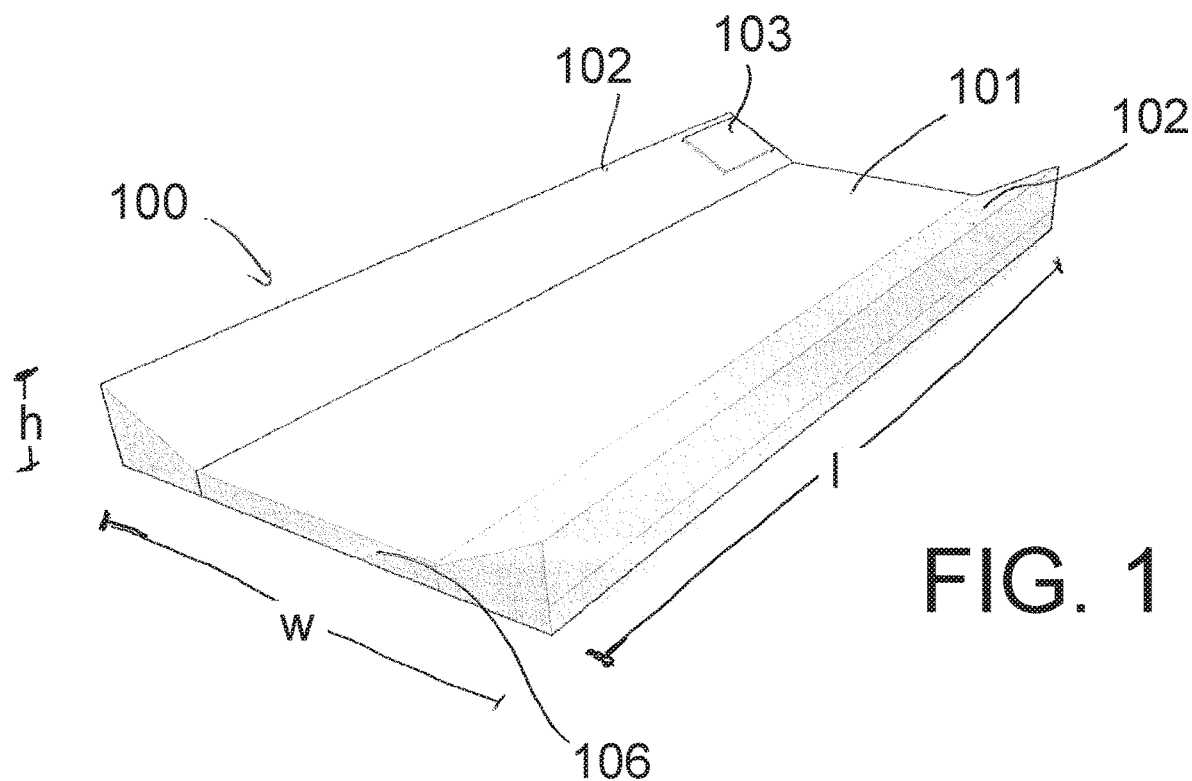
FIG. 1 is a first perspective view of an exemplary smart diaper changing pad.
Figure 2:
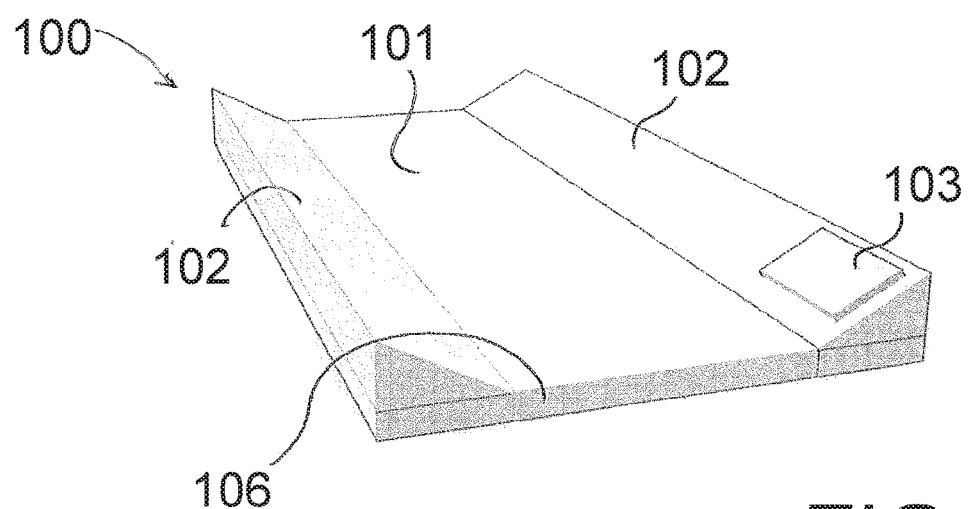
FIG. 2 is a second perspective view of an exemplary smart diaper changing pad.
Figure 3:
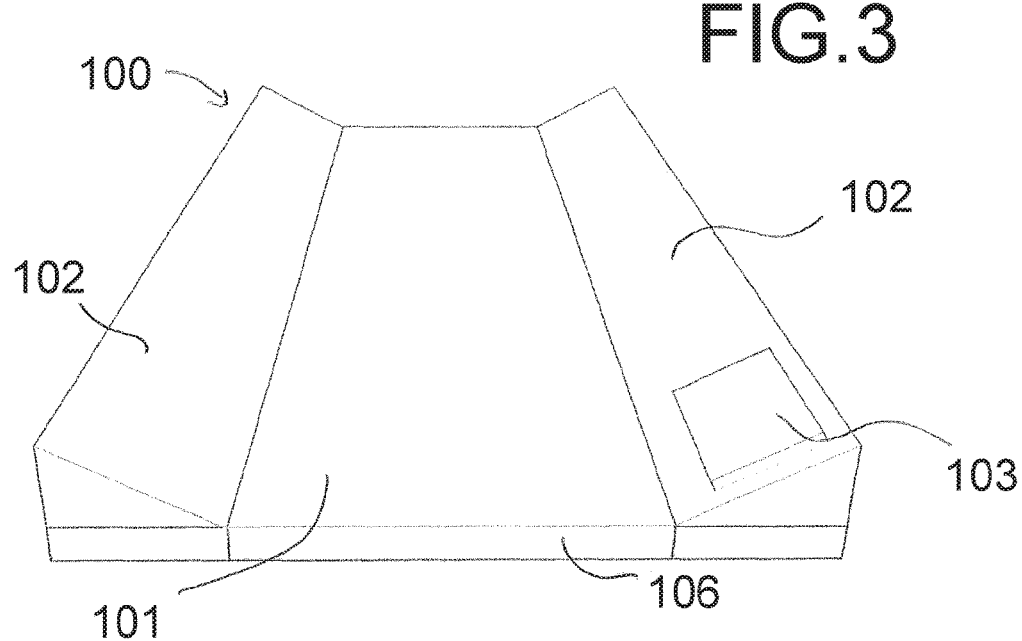
FIG. 3 is an elevated end-on view of an exemplary smart diaper changing pad from the right side.
Figure 4:
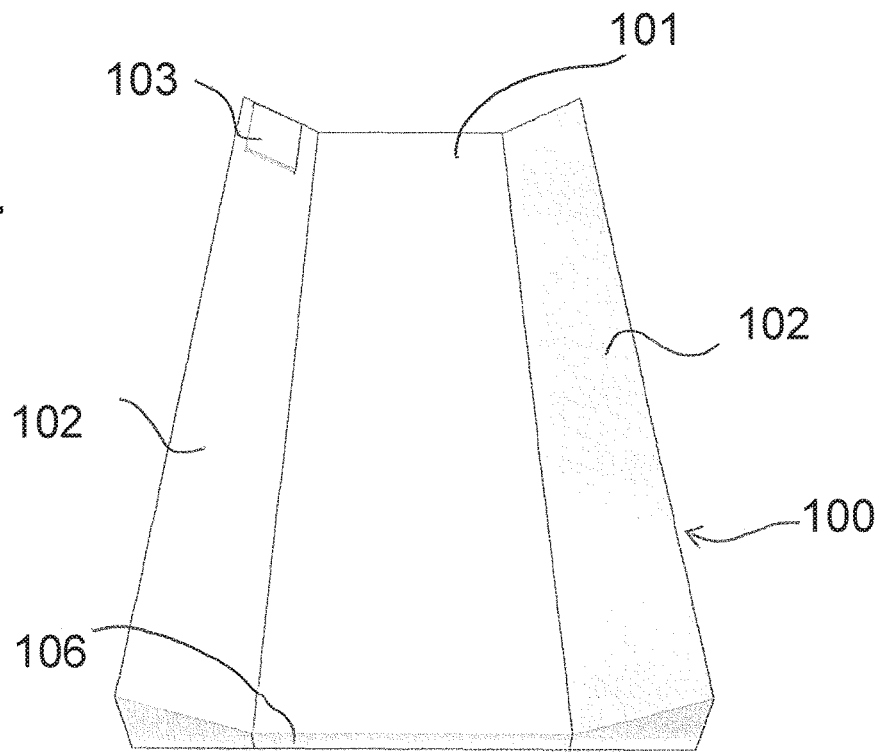
FIG. 4 is an elevated end-on view of an exemplary smart diaper changing pad from the left side.
Figure 5:
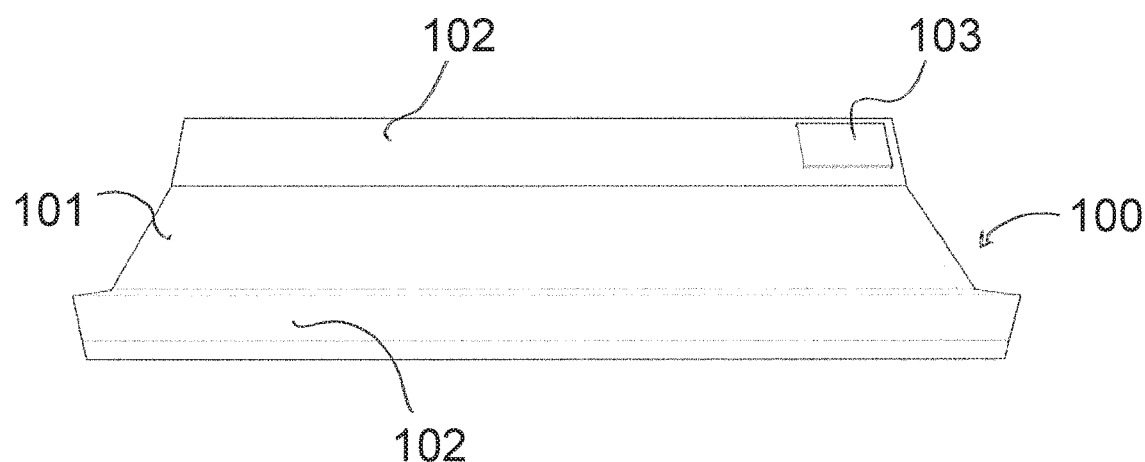
FIG. 5 is an elevated side view of an exemplary smart diaper changing pad from the front.
Figure 6:
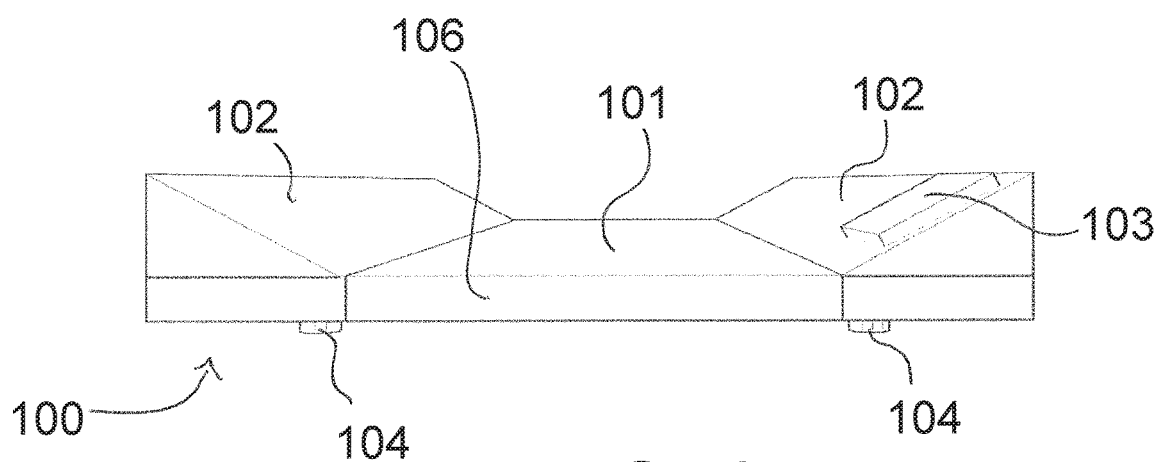
FIG. 6 is an end-on view of an exemplary smart diaper changing pad from the right side
Figure 7:
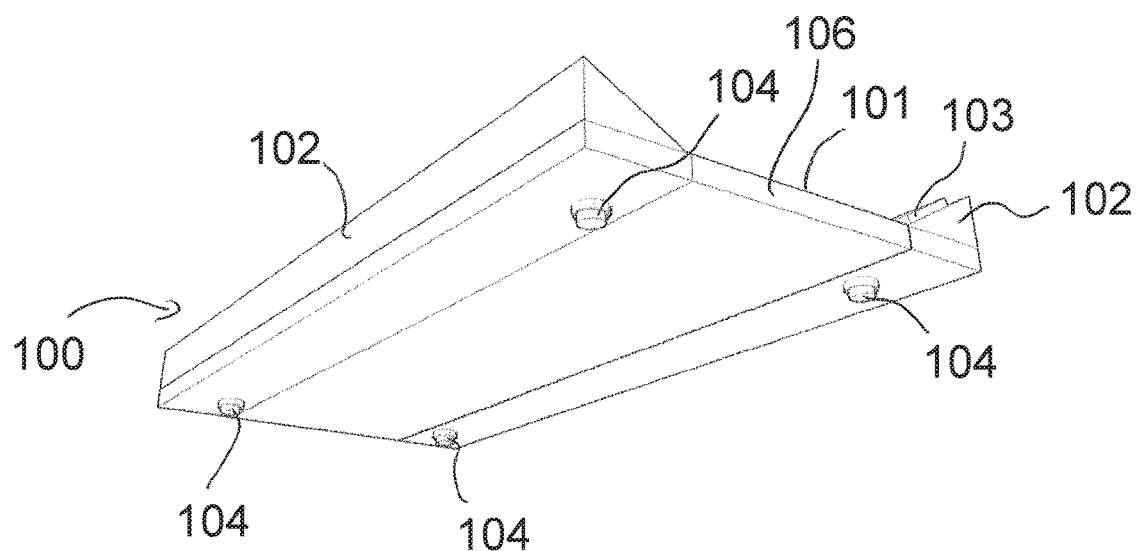
FIG. 7 is a perspective view of an exemplary smart diaper changing pad from below
Figure 8:
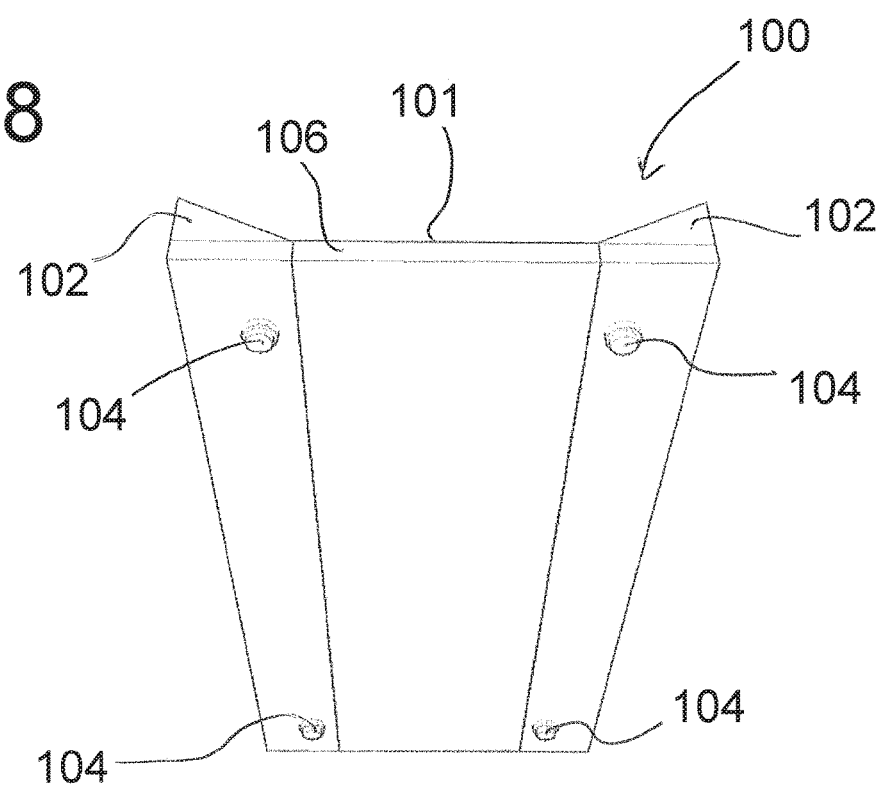
FIG. 8 is an end-on view of an exemplary smart diaper changing pad from below the right side
Figure 9:
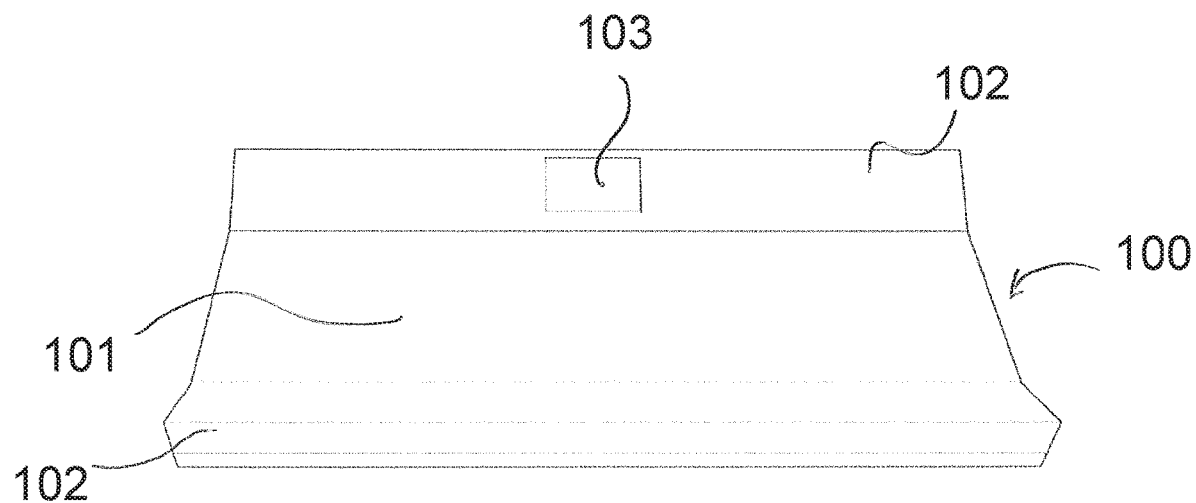
FIG. 9 is an elevated side view of an exemplary smart diaper changing pad from the front.
Figure 10:
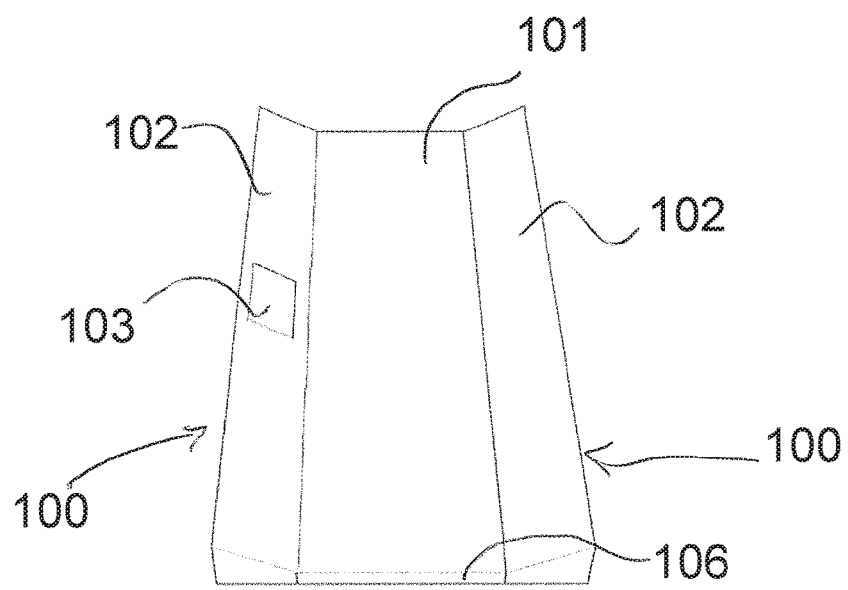
FIG. 10 is an elevated end view of an exemplary smart diaper changing pad from the left side.
Figure 11:
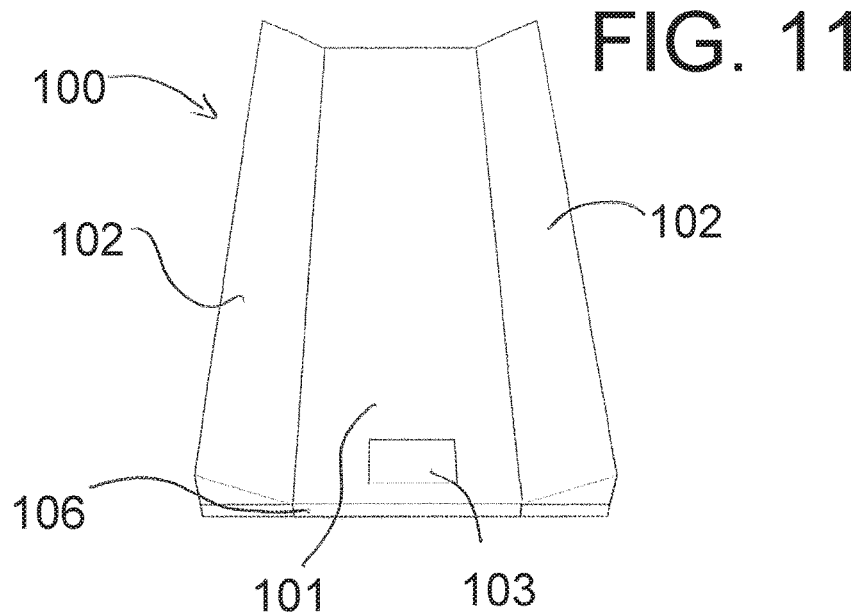
FIG. 11 is an elevated end view of an exemplary smart diaper changing pad from the right side.
Figure 12:
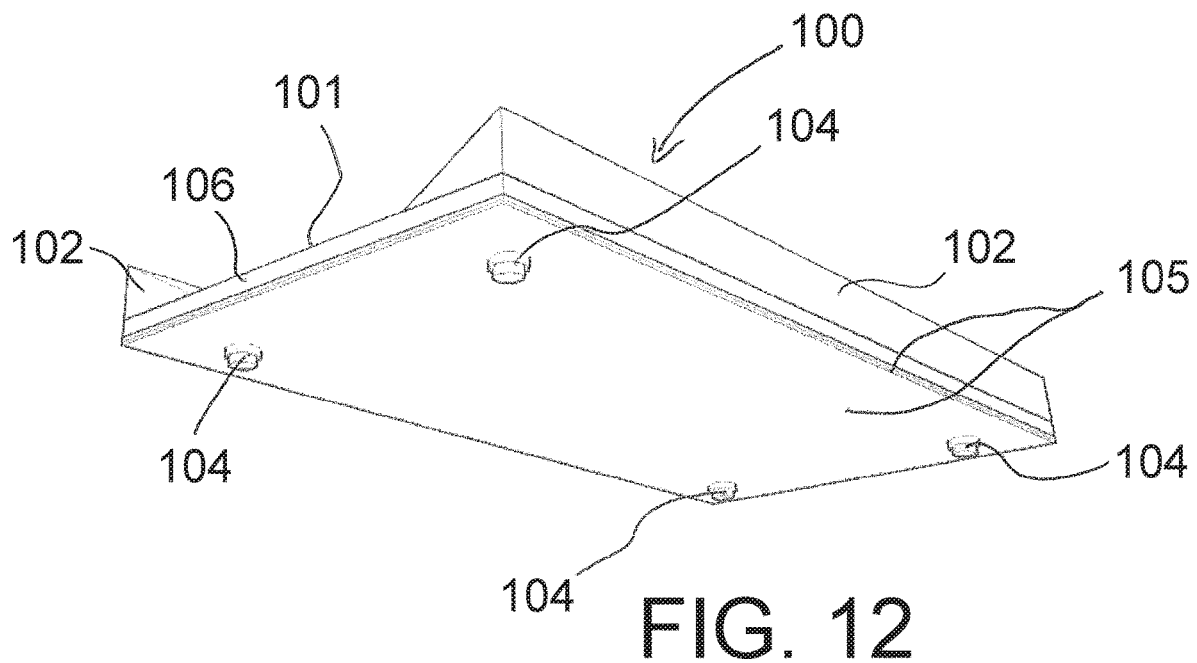
FIG. 12 is a perspective view of an exemplary smart diaper changing pad from below to show the rigid platform.

As demonstrated by the three different display 103 locations in FIGS. 1, 9, and 11, the display 103 can be located or oriented anywhere on the smart diaper changing pad 100. Because the pad 100 is primarily used by a parent standing alongside the long side of the smart diaper changing pad 100 (to the baby's right or left), it may be preferable in some embodiments to arrange the display 103 in such a way that the information on the display 103 appears right-side up for a user standing alongside the long side of the smart diaper changing pad 100. The display 103 can be set on the central depression 101 or on the elevated sidewalls 102. In one embodiment, the display can be rotated 90 degrees to be legible for user's standing either alongside the long side of the smart diaper changing pad 100 or at the base of the smart diaper changing pad 100. This rotation may be a mechanical movement or the display may simply rotate the orientation of the elements on the display 103.

In a series of alternate embodiments not shown in the FIGs., the elevated edge 102 surrounds the central depression 101 on all sides, either with four orthogonal sides 102 or with an ovular or figure-eight sidewall 102 surrounding the entire pad 100. In another embodiment, the sidewall 102 is generally U-shaped with one open end where the baby's legs will be located. Still other embodiments include a curved central depression 101 to keep a baby in place in the center of the smart diaper changing pad 100 during a diaper change. In some embodiments, the portion of the smart diaper changing pad 100 that will support a baby's head may be elevated from the portion of the smart diaper changing pad 100 that will hold the baby's legs with the entire central depression 101 angled down from head-side to leg-side.

In some embodiments, a leash (not shown) of material that can be anchored to a dresser, changing table, or other piece of furniture with a nail, tack, or snap (not shown). The changing pad leash, along with the slip-resistant feet 104 and the nursery furniture frame are intended to secure the baby changing pad 100 so it will not tip off of the furniture as a baby adjusts position. In some embodiments, the changing pad 100 includes a safety belt, vest-like restraint, or swaddle restraint (not shown) to further reduce the chance of a baby rolling or falling off of the changing pad 100.

In other embodiments (not shown), the smart diaper changing pad 100 may be foldable so that it can be made portable or more easily stored. The smart diaper changing pad 100 may fold multiple times, so long as the force or mass sensors are the only things bearing any baby weight during measurements.

In still other embodiments (not shown), the smart diaper changing pad 100 will include pockets (not shown) to store items such as clean diapers or wipes or hooks or loops (not shown) so that the smart diaper changing pad 100 can hang from a stroller or shoulder. Alternatively the smart diaper changing pad 100 could include hooks (not shown) that attach a garbage bag so that parents have somewhere to store their dirties.

Additionally in some embodiments, the display 103 can be entirely disconnected from the smart diaper changing pad 100 and continue to display information from the smart diaper changing pad 100. The display could be placed or mounted somewhere convenient for the parent to look during a diaper change or feeding, and the display could communicate wirelessly with the smart diaper changing pad 100. In some embodiments, the removable display would include a touchscreen 103, buttons 126, or some other user feedback element that can control the smart diaper changing pad 100 wirelessly. In some embodiments, the display may include its own secondary battery 121 or could be mounted somewhere that provides an external power source 121 for the display. The secondary battery 121 could charge from the power in or running through the smart diaper changing pad 100 whenever the display is docked with the smart diaper changing pad 100.

One or more external communication systems 124 may be incorporated into the smart changing pad, including both wired and wireless communication. A wired communication system 124 (including Ethernet, USB, USB type C, and many others), is the most simple, but not always the most desirable. In some embodiments, cables may be undesirable, presenting a potential hazard for young children, making wireless communication preferable. In some embodiments, the smart diaper changing pad 100 may comprise a wireless communication module 124, which encompasses all of the elements necessary or desirable to communicate over one or more specific wireless protocols. The smart diaper changing pad 100 may incorporate one or more wireless communication protocols, including cellular network (including 2G, 3G, 4G, and LTE), GSM, CDMA, AMPS, EDGE, HSDPA, UMTS, WLAN/Wi-Fi (IEEE 802.11), WiMAX, Bluetooth (IEEE 802.15), BLE (Bluetooth low energy), ZigBee (IEEE 802.15.4), wireless USB/ultrawideband, wBAN (802.15.6), infrared, NFC, or any type of proprietary communication methods. These are a few of the known wireless protocols available for incorporation in a smart device, but others may be used or included without departing from the present invention.

The smart diaper changing pad 100 (or any electronic peripheral) can communicate directly with another device (e.g., Bluetooth communication between the smart diaper changing pad 100 and a mobile phone 10) or directly with an external cloud or network (such as Wi-Fi access to a local network which allows external communication to remote data storage). It may be sufficient to include only one wireless protocol 124, but in some other cases it may be desirable or economically reasonable to include multiple wireless protocols 124.

In some embodiments, the smart diaper pad 100 may include a processor 122 and a memory 123 capable of storing information, both short-term and long-term, and processing the change in electrical parameters received from the force or mass sensors 125 to calculate a force or mass. The processor 122 may also convert the information into familiar units such as newtons, grams, kilograms, ounces, pounds, stones, or any other unit of force or mass. The processor 122 may also perform other tasks such as control power management, drive and control a display 103, organize information for transmission to a separate computing device 10, determine when to begin or stop measuring or recording, determine when to power on or power off the smart diaper changing pad 100, control how to store and access memory 123, and/or any other processes that the smart diaper changing pad 100 may need to perform locally. The processor 122 may be a single general purpose processor with one or more cores or may refer to a group of general purpose or specific-purpose processors working together. The memory 123 may include both random access memory 123a for running applications or processes and long-term storage memory 123b. The memory 123 may be selected from solid state, traditional magneto-mechanical, DNA-storage, holographic storage, or any other data storage technology.

In some embodiments, the smart diaper changing pad 100 will require a power supply 121 to provide an electric bias for any sensors 125, to illuminate or control the display 103 (including, for example, both displaying an image on an LCD and illuminating the LCD with an LED) or feedback elements 128, to access or record information to and from the memory 123, to power the processor 122, and to generally enable any type of electronic performance. This power supply 121 may be a cable drawing power from an outside source such as a wall socket, a USB plug, an external battery, or a computer. Alternatively this power supply 121 may be a chemical battery or any other element capable of locally storing energy. Because the smart diaper changing pad 100 will be used with babies and small children, it may be preferable to minimize external wires for safety. With the goal to minimize risk to children, it may be preferable to rely on internal batteries for the power supply 121 in some embodiments. These batteries 121 may be rechargeable or replaceable, and there may even be an energy harvesting device (e.g. a solar cell or an element capable of capturing energy from movement or heat) incorporated within the device. Alternatively wireless charging may be used to power the smart diaper changing pad 100 without endangering children.

In one embodiment, wireless charging could connect to a piece of charging furniture incorporating one or more charging pads. That piece of furniture may connect to a central power source or wall socket, and may optionally include a socket cover or socket sheath to avoid endangering children. Each piece of powered nursery equipment could rest on top of or couple to one of the wireless charging pads and therefore obtain external power without adding any potentially hazardous wires to the nursery.

The wireless charging pads could be configured to only provide power when a recognized device is coupled, so there is no risk of unintentionally shocking a human or damaging any other electronic device. Alternatively the furniture could function as a power extension cord or hub. Instead of including a wireless charging pad that radiates energy, the furniture could have conveniently located sockets for direct-socket devices that draw power through the charging furniture. The furniture could connect directly to a power and/or data source and a series of sockets or ports could be built directly into the top or sides of the furniture. Although it is easy to imagine this arrangement with traditional wall electric sockets or USB ports, this arrangement could be used for any kind of power, data, or power/data connector. For example, a dresser or chest could draw power from a wall socket and have a series of electric sockets built into the top of the dresser or chest. The connection to the wall socket could be made in a way to eliminate any choking or swallowing danger from children (e.g., a rigid extension couples to the wall socket and potentially screwed directly into the wall socket so it cannot be trivially detached). Additionally a surrounding sheath or manifold could protect the socket from outside interference. The direct-socket charging electronic nursery equipment designed for the charging dresser could be designed to eliminate any external wires so that the bottom of the nursery equipment or peripherals has fold-down prongs or fold-down male connectors that plug directly from the base of the peripheral into the charging nursery furniture.

Instead of traditional wall sockets or USB, this direct-socket connection could also be a proprietary connector. It may be preferable in some embodiments or with some connectors to have an emptying cavity from the bottom of each socket in case any type of liquid spills in. In other embodiments, the sockets could have spring-loaded covers that are pressed out of the way by matching prongs to keep a curious or wandering child from having an unexpected electric surprise. In some embodiments, it may be preferable to use a lower current power source (e.g., the 5 volts available from traditional USB) for nursery equipment because the lower current could pose significantly less risk of electrocution.

In some embodiments, these direct-socket pluggable peripherals could also include a battery back-up and run off of battery power whenever they are not receiving an external charge. An indicator LED could let you know if the device is running off of battery or external power. The devices could include a low power mode when running off of battery, for example producing less light or spinning at a lower speed. In some embodiments, users could disable low power mode and burn battery power faster if the user thought the improved experience was worth the shortened battery life.

Direct-socket charging electronic nursery equipment could optionally run exclusively off of the direct-socket charging power or they could also include internal batteries to run when not paired with a direct-socket charging furniture. Direct-socket charging electronic nursery equipment could include breast pumps, baby monitors, nightlights, video cameras, infrared baby monitors, phone-charging docks, moving or musical baby toys, displays, speakers, the above-discussed smart diaper changing pad 100, or any other electronic device that may assist a parent with a baby or conveniences a parent while the parent spends time with a baby. Any of these elements could include additional sensors to improve the behavior of the individual devices.

In some embodiments, the smart diaper changing pad 100 would include user interface or input controls 126 such as a touch screen, buttons, knobs, switches, or voice or gesture recognition activation (due to potentially dirty hands). These user input controls 126 could include controlling whether a device is powered on, when to take a measurement, a tare/multitare/untare function, which parent profile is active, which baby profile is active, what unit of measurement is displayed, the brightness of display 103, and whether any peripheral attachments are activated.

The smart diaper changing pad 100 may include any other sensors 125 that may be useful for monitoring your baby's health or development. These sensors 125 can monitor any number of bio-variables including—but not limited to—conductivity, capacitance, impedance, muscle percent, fat percent, hydration, heart rate, body temperature, and glucose levels in addition to weight measurement.

In another embodiment, the smart diaper changing pad 100 could be configured to enable multiple peripheral attachments. These peripherals may be non-functional, powered, or even require water pressure, any of which could be enabled through the smart diaper changing pad 100. These attachments may be intended to distract and entertain a baby such as a mobile or dangling toy or a light, speaker, or display. The attachments may also be intended to make the changing process easier or more convenient, such as a water spray nozzle that receives water from a connection point on the smart diaper changing pad 100 or an infrared light or heating pad to warm a baby during the changing process. Any water or power may be routed through the smart diaper changing pad 100 to the peripheral. The smart diaper changing pad 100 could be connected to a water source, which would enable any water-powered or water-providing peripheral. The smart diaper changing pad 100 could similarly provide electricity to any powered peripheral through a connection point (e.g., USB plug, wireless power, or proprietary connection point). Peripherals could include an attachment for measuring baby length, speakers, lights, displays, powered toys, water sources, suction devices, blowing devices, warming devices, wipe-warmers, cameras, or additional add-on sensors (e.g., an IR (infrared) thermometer or a heart-rate monitor).

One specific embodiment of a smart changing pad 100 attachment is a device for determining baby height, baby length, or baby girth. This dimensional measuring device could be as simple as a ruler that is permanently marked on the device or as complicated as a combination of light emitters and light detectors (including invisible light frequencies) that measures the length that the baby blocks. Another embodiment of a dimensional measuring device for the smart changing pad 100 would be a measuring tape that anchors to the smart diaper changing pad 100. The smart diaper changing pad 100 could automatically record the distance that a measuring tape is unwound either automatically or when a user clicks an associated button. Alternatively a parent could manually enter the parents dimensions after visually noting the baby's dimensions against markings on the smart changing pad 100.

In another embodiment, the smart diaper changing pad 100 could communicate, either wirelessly or through optical sensing, with a device that the baby is wearing, thereby collecting more information for parents. One example of a useful wearable would be a smart diaper that can send a signal when a diaper needs to be changed, such as the recently proposed TweetPee line of diapers from Huggies®. This signal may be sent when the diaper notices that certain pockets are saturated with liquid or stretching due to excess weight. The time from the diaper signaling the need to be changed until the diaper is actually changed can be recorded. Parents could use this as one indicator to determine if a nursery or pre-school is providing adequate or insufficient attention to a child. Additionally the smart diaper changing pad 100 could communicate even with non-smart diapers. There are a number of chemically reactive diapers coming out these days, such as the Pixie Scientific diapers that analyze a baby's waste to determine if a baby is experiencing any detectable health issues or chemical imbalances. A camera or sensor 125 attached to the smart diaper changing pad 100 could analyze the grid on the Pixie Scientific diapers and record which colored boxes were triggered.

Figure 13:
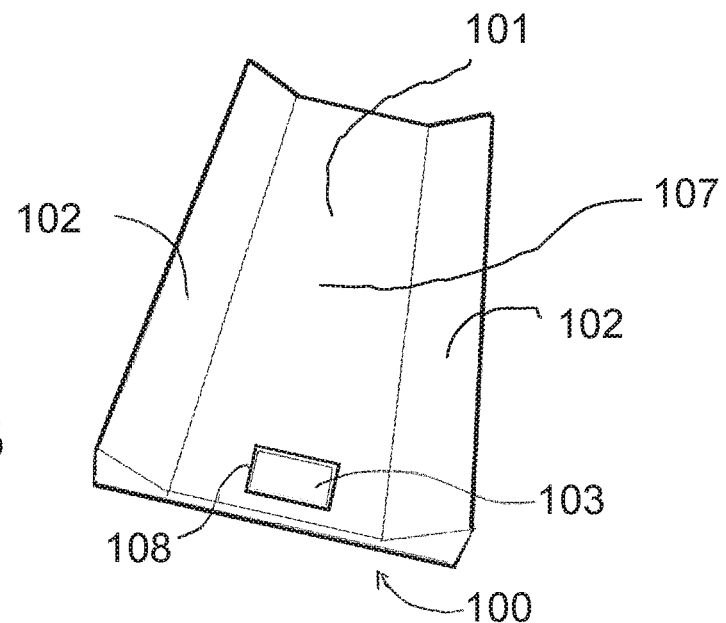
FIG. 13 is an elevated end view of an exemplary smart diaper changing pad inside of a smart diaper changing pad cover from the right side.

Referring now to FIG. 13, in some embodiments, the smart diaper changing pad 100 may be covered with a changing pad cover 107. Changing pads 100 frequently include an outer surface made from vinyl, plastic, silicon, or some other water-resistant material that is easy to clean. Unfortunately these materials can be cold and clammy to the touch, making a baby uncomfortable during the cleaning and changing process. Changing pad covers 107 are typically plush or fabric covers that stretch over a changing pad 100 and are secured by elastic tension or some other mechanism. In some embodiments, the changing pad cover 107 may include a transparent window 108, through which a user can view the display 103 on the changing pad 100.

Referring now to FIG. 14, and as previously described, if there is a hard frame or platform 105, the elements of the frame within reach of a baby should be padded or cushioned 106 beneath the outer material. In some embodiments, this changing pad cushion 106 may rest on top of the smart diaper changing pad 100 and cushion the central depression 101 and the elevated sidewalls 102.

Referring to FIGS. 15-18, separate computing device 10 includes a display or touch screen 11 and one or more user interfaces 12. Although FIGS. 15-18 show the smart diaper changing app accessed on a smartphone 10, similar information may be accessed through a webpage. In one embodiment, any information measured, recorded, or entered into the smart diaper changing pad 100 may be shared with a smart diaper app running on a separate computing device 10. Some examples of separate computing devices 10 include smartphones such as the Apple® iPhone or the Samsung Galaxy Note®. As an example, a Bluetooth or Wi-Fi enabled smart diaper changing pad 100 can communicate directly with a smart diaper app on a smart phone 10. The smart diaper app on a smartphone or tablet 10 can make a note of all weight recordings or sensor recordings over time and keeps a comprehensive record of diaper changes. This record may include measurements taken by multiple devices and even measurements manually entered by a parent or smart diaper app user. The smart diaper app may even allow users who do not own a smart diaper changing pad 100 to manually enter all recordings and to enjoy many of the same features as the smart diaper changing pad 100 owners.

FIG. 15 shows an exemplary weight chart screen in the smart diaper changing app running on a separate computing device 10. The present screen of the smart diaper changing app displays a weight chart generated either through manual data entry in the smart diaper changing app or automatically by the smart diaper changing pad. The graph shows various curves for statistically significant curves, such as $25^{th}$ percentile, mean, median, and $75^{th}$ percentile. The screen also identifies the profile that is charted by name, age, and displays the profile's current weight and weight percentile. As shown in FIGS. 15-18, in some embodiments, regardless which screen a user is on, the smart diaper changing app includes one or more quick-access buttons to immediately open a specific page (in this case, the five quick-access buttons point to the profile page, the weight chart, the height chart, the feeding detail page, and the sleep detail page. In another embodiment, another quick-access button could be included to access the diaper diary page described more completely with regards to FIG. 17 below.

Figure 16:
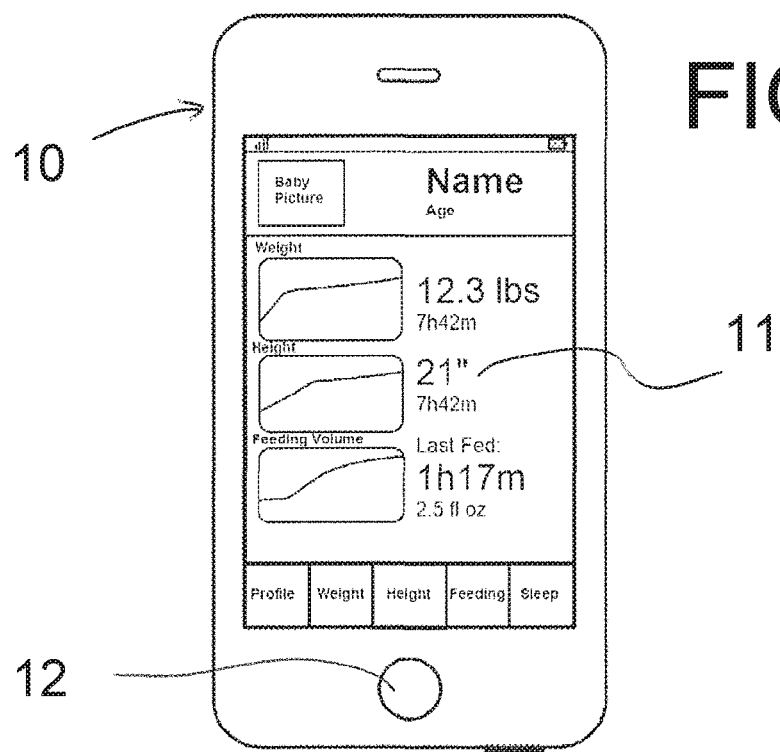
FIG. 16 is a view the baby profile screen in the smart diaper changing app as accessed via a separate computing device

FIG. 16 shows an exemplary profile-at-a-glance screen of the smart diaper changing app. This screen of the smart diaper changing app displays a collection of relevant charts, intended to provide quick access to relevant information, including current baby weight with a miniaturized weight chart, current length with a miniaturized length chart, and volume of the last feeding with a miniaturized feeding volume chart. All 3 subsections indicate how long it has been since the last information was entered, along the overall profile information, including the name and a photo of the baby associated with the profile along with the baby's age.

Figure 17:
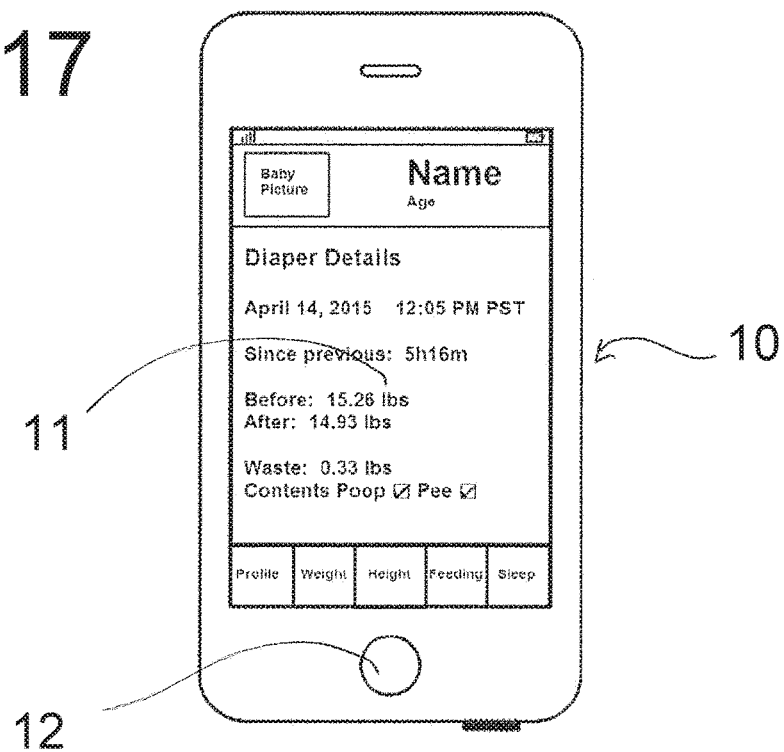
FIG. 17 is a view the diaper diary screen in the smart diaper changing app as accessed via a separate computing device
Figure 18:
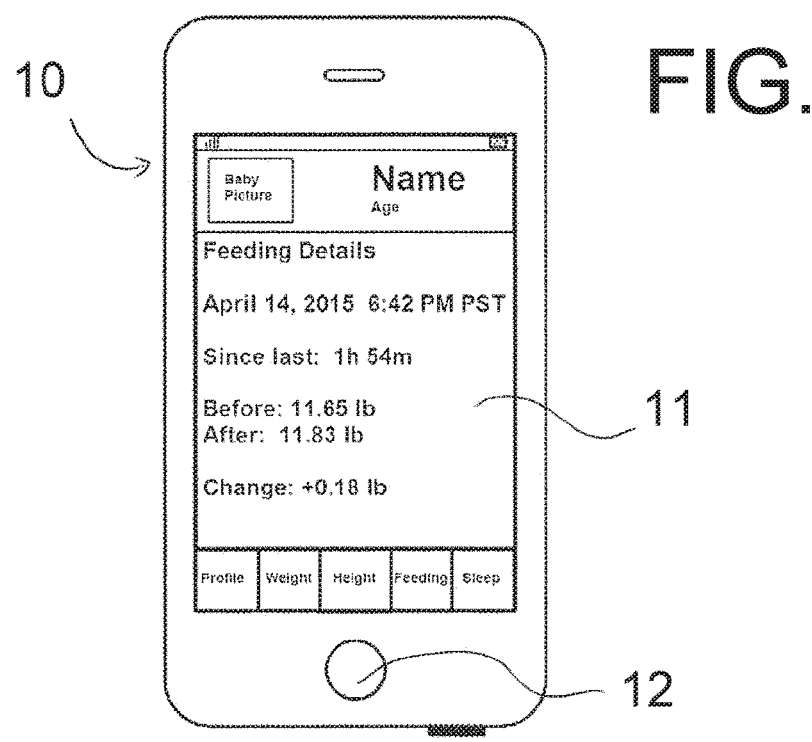
FIG. 18 is a view the feeding detail screen in the smart diaper changing app as accessed via a separate computing device

FIG. 17 shows an exemplary diaper diary screen in the smart diaper changing app, which displays the time and date of the most recently recorded diaper change, how much time has passed since that change, the changed baby's weight before and after diaper change, the net change in weight attributable to the dirty diaper, and checkboxes indicating whether that particular diaper included urine or feces. Turning to FIG. 18, an exemplary feeding detail screen displays the time and date of the most recently recorded feeding, how much time has passed since that feeding, the changed baby's weight before and after feeding, the net change in weight attributable to the consumed liquid. In some embodiments, the feeding detail screen would also display an estimate of the fluid volume consumed based on a mass to volume conversion estimate.

In one embodiment, the smart diaper changing pad 100 will automatically tare when it is first turned on. This could be when it detects nearby motion, when a user input control 126 is activated, or in response to any type of input or observed behavior. In another embodiment there is a tare button 126 that a parent can press just before placing the baby on the smart diaper changing pad 100. A user can also tare (or zero out) the smart diaper changing pad 100 before a diaper is removed to negatively measure the weight of the dirty diaper or at any other time.

In one embodiment, the smart diaper changing pad 100 will take a measurement when a baby is first placed on the smart diaper changing pad 100, another measurement when the smart diaper changing pad 100 determines that the diaper and its contents have been removed from the smart diaper changing pad 100 (preferably after cleaning, but in some embodiments this could be before cleaning), and a third measurement after the baby is dressed in a fresh, clean diaper. Parents can note if they change the baby's clothing or changed diaper types, which may account for some of the weight changes. In some embodiments, additional measurements may be taken as the benefit for such measurements is observed, but with just the three measurements explained above, parents can ascertain and track a wealth of data. Any of the three measurements can be used as the measurement to track historically. The historical graph could also include two or three of these measurements on one graph, possibly indicating the max and min ranges for baby weight at that measurement. The difference between the first measurement and the third measurement is an estimate of the waste contained in the dirty diaper. The difference between the second measurement and the third measurement may be estimated as the sensor reading for a clean diaper alone, which may be useful for calculation in future measurements. In another embodiment, the different diapers may include a tag that quickly identifies the diaper type and the exact weight of the diaper used.

In one embodiment a smart diaper changing pad 100 measurement could actually be an average across a set number of multiple measurements or a recognized plateau when a pre-determined number of measurements fall within an acceptable range. A measurement may also be manually recorded when a parent presses a measurement button. The smart diaper changing pad 100 and smart diaper app each track expected measurement ranges and alert a parent if a measurement falls outside of expected ranges. Unexpected measurement results may be excluded from the main body of a graph or chart.

The data from the smart diaper changing pad 100 can be charted and graphed over time, including notable milestones. For example, parents can note when a baby's first tooth came in, when a baby switched to formula or solid food, when a baby first slept through an entire night, when a baby first lifted its head, when a baby first crawled, when a baby took its first step, and when a baby spoke its first word or sentence. The smart diaper app can also note humorous or useful statistics such as diapers changed per day, most diapers changed in a day, which days included the most total waste product, the highest number of diaper changes in a single day, and the largest amount of waste in any single diaper. These "achievements" can be tracked across multiple baby profiles or across multiple user profiles.

Pediatricians frequently request a diaper changing diary for at least the first month, so the smart diaper app can automatically and conveniently format such a diaper changing diary for the doctor. The typical columns would be diaper change time, estimate of amount in the diaper, and whether the diaper contained urine, feces, or both. Each of these columns may be automatically recorded or estimated by the smart diaper changing pad 100. The smart diaper changing pad 100 can estimate the contents of the diaper based on weight, or can use a sensor to actually read the contents (e.g., urine, feces, or both). Parents may also manually enter or be prompted and confirm the contents of a diaper.

Information can be tracked between multiple parents or caretakers. Each parent can either select his or her profile when he changes a diaper or the smart diaper changing pad 100 can recognize which parent is performing the actions. The smart diaper app or smart diaper changing pad 100 may note which parent changed the most diapers, which parent changed the most inconvenient diapers (e.g., late at night) or messiest diapers, and which parent changed the most recent diaper (possibly recording which parent may be responsible for the next diaper change). Babies should be changed at regular intervals, sometimes as frequent as every 3-4 hours, which sometimes necessitates multiple changes in a single night. Tracking which parent is on diaper duty, the smart diaper changing pad 100 can wirelessly send an electronic alert to the currently responsible parent when it is time to change a diaper. Additionally a microphone 127 incorporated into the smart diaper changing pad 100 or pairing with a baby monitor (either of which is presumably in a nursery with a baby at night) can be used to trigger the next alert message. If a baby starts to cry in the middle of the night, an alert can be specifically sent to the on-deck parent's mobile phone, wearable, or tablet 10, waking only the parent who is currently responsibility to change the next diaper. Alternatively parents can pre-set which parent has responsibilities during which hours so that only the responsible parent is alerted. In another embodiment both parents are sent a message, possibly indicating who should be taking the next action. The smart diaper app may also keep track of how long each parent takes to respond after an alert.

The smart diaper app can gamify the diaper changing experience between multiple users. Each user gains points for each diaper change, potentially gaining bonuses for the mass of the diaper change or for inconvenient times of day or taking on the diaper change duties when it isn't that user's turn or responsibility. Parents could use the gamification system to make sure that elder children are performing adequate chores around the house, and could use the gamification score to determine if an elder child can take a break for playing outside or playing video games.

A parent can chart multiple children within a family against each other to compare milestones or growth. Additionally multiple parents can compare children or to national means or medians or other statistically significant numbers (e.g., $25^{th}/75^{th}$ percentile or $7^{th}/93^{rd}$ percentile).

In another embodiment, the smart diaper app can associate digital memories (e.g., pictures, audio recordings, or videos of the baby or family) in the user's smartphone 10 or personal cloud storage with the baby record. Because most photographs and videos taken today include a specific timestamp, the smart diaper app or software can place the digital memory exactly where it occurred in the baby's growth and development. Family digital memories could be simultaneously associated with multiple children who appear in the photograph. Users could directly compare multiple profiles representing multiple different children at the exact same age, even if those multiple children were born years apart. With permission, users could also see other babies at the same age or same weight as their own baby for comparison. Parents with multiple profiles for multiple children stored could look at one of their children's growth curves and compare directly to their other children at that stage in development, either layered together on a single graph or side-by-side. Parents can also share access to the children profiles with other friends and family who do not own a smart diaper changing pad 100 so that friends, relatives, researchers, or health professionals can benefit from seeing the child's profile and history. This remote sharing can be user-specific or anonymous depending on user preference. Additionally the remote sharing access can be restricted to a handful of known and identified users or opened up so that everyone can see and access the information. The smart diaper app can offer incentives (such as emoji, in-app benefits, or discounts on products sold through the smart diaper app or by popular retailers). Additionally users can use the smart diaper app to send invitations to other potential users that the sending user thinks would benefit from the smart diaper app or smart diaper changing pad 100.

Additionally parents can use the smart diaper changing pad 100 to assist in determining if a baby is eating enough. It is not possible to determine how much a baby has breastfed directly from observation, so the best way to detect baby consumption is to weigh a baby before and after breast feeding. In one embodiment, the smart diaper changing pad 100 incorporates a breastfeeding or feeding calculation mode. The parent can turn on feeding mode, weigh the infant before feeding begins, and then weigh the infant again after feeding. The smart diaper changing pad 100 can determine the weight difference and even convert that to an estimated liquid volume and an estimated caloric intake. The smart diaper changing pad 100 or smart diaper app can also track the total weight, volume, or caloric content of all feedings over a period of time and compare that to recommendations for that baby's age. The smart diaper app or smart diaper changing pad 100 can also correlate the feeding gains to the diaper change losses, showing both in one chart or graph. If the feedings fall short of expected, pre-set, or healthy ranges, the smart diaper app may suggest a visit to a pediatrician or lactation specialist. Similarly if a baby's weight or hydration falls outside of expected ranges, the smart diaper app may suggest a visit to a pediatrician.

Doctors and specialists can use the complete growth history, the feeding history, and the diaper history to get a better insight into the baby's health. Parents can choose to send a complete chart to their medical professional to share information with a doctor without having to bring a newborn into a potentially germ-filled doctor's office. Alternatively parents can e-mail, text, wirelessly transmit, or print and bring charts with them for a doctor visit or specialist visit.

Additionally the aggregation of data may allow medical professionals a greater insight into newborn and baby development, allowing doctors to provide better care to newborns and babies in the future. In one embodiment, parents have the option to share their information anonymously with medical professionals. In another embodiment, parents have the option to share their baby's information with the community to improve the representative data available through the smart diaper application.

One or more of the features illustrated in the figures may be rearranged and/or combined into a single component or embodied in several components. Additional components may also be added without departing from the invention.

Although elements of this invention are discussed as a smart diaper changing pad 100, the functional electronic elements could be easily incorporated into other common nursery devices such as cribs, play mats, bassinets, baby walkers, car seats, potty training seats, and swings without departing from the invention. The same electronics should work in any of these form factors with only minor variations.

Additionally the same electronics could be incorporated into products for pets or animals. The same electronics could be easily incorporated into a dog mattress or a cat tree/cat scratching post to passively create a pet's weight history while the pet rests. A feeding platform could also quickly and easily incorporate the same electronics to measure a pet's weight and food intake each time the pet steps onto the platform to approach the pet's food.

Instead of pets, this same feature could be incorporated into an "unwelcome mat" that is placed in front of the refrigerator, so that every time a user steps on the mat and looks for something to snack on, the "unwelcome mat" reminds the user of his or her weight to discourage unhealthy eating habits. The electronic elements could also be incorporated into a toilet seat so that a curious user could track the total weight change during a single toilet use or over a set period of time.

It is to be understood that some terms are used interchangeably in this description. As an example, changing pad, diaper pad, diaper changing pad, changing and cleaning pad, diaper changing and cleaning pad, diaper cleaning pad, and cleaning pad (collectively 100) may all be used interchangeably in this specification while referring to the same basic structure. Similarly any reference to a computer, computing device, or mobile device 10 should be read to inherently include a computer, tablet, mobile phone, smartphone, or wearable computer. Additionally while many embodiments specifically discuss an electronic scale, the smart diaper changing pad 100 could also incorporate one or many other features without specifically incorporating an electronic scale. Additionally any action attributed to the smart diaper app can be performed by either the smart diaper app or the smart diaper changing pad 100 and any action attributed to the smart diaper changing pad 100 may be performed by the smart diaper app without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:
1. A smart scale system comprising:
a scale comprising:
an ovular weighing platform comprising two elevated sidewalls connected to and curving up from opposite sides of a cushioned surface, the weighing platform comprising a rigid lower element beneath a foam upper element with a waterproof or water resistant outer surface;
four slip-resistant feet extending from the bottom side of the rigid lower element, each foot including a sensor configured to measure force or mass;

a processor configured to convert the readings from the four sensors to determine a weight reading;

a memory connected to the processor and configured to store the weight readings;

a Bluetooth or Bluetooth Low Energy communication module configured to wirelessly transmit the weight readings to an electronic mobile device; and a power source; and an application running on the electronic mobile device that, when executed, causes one or more processors in the external computing device to:

wirelessly receive the weight reading from the wireless communication module of the smart scale system;

record the weight reading in a weight log associating the weight reading with a user profile;

display the weight reading on a screen of the electronic mobile device;

chart the weight readings in the weight log for the user profile over time; and transmit the weight reading to a cloud data storage.

2. The smart scale system of claim 1 wherein the smart scale system includes a nursing function that comprises:

determining a first weight reading before nursing an infant;

determining a second weight reading after nursing the infant;

calculating the difference to determine the feed weight of liquid consumed by the infant; and displaying the feed weight on the screen of the electronic mobile device.

3. The smart scale system of claim 1 wherein the smart scale system includes a changing function that comprises:

determining a first weight reading before changing an infant's diaper;

determining a second weight reading after changing the infant's diaper;

calculating the difference to determine the waste weight in the diaper; and displaying the waste weight on the screen of the electronic mobile device.

4. A smart scale system comprising:

a scale comprising:

a weighing platform comprising two elevated sidewalls connected to opposite sides of a cushioned surface, the weighing platform comprising a rigid lower element beneath a cushioned upper element;

a plurality of slip-resistant feet extending from the bottom side of the rigid lower element, each foot including a sensor configured to measure force or mass;

a processor configured to convert the readings from the plurality of sensors to determine a weight reading;

a memory connected to the processor and configured to store the weight readings;

a wireless communication module configured to wirelessly transmit the weight readings to an electronic mobile device; and a power source; and an application running on the electronic mobile device that, when executed, causes one or more processors in the external computing device to:

wirelessly receive the weight reading from the wireless communication module of the smart scale system;

record the weight reading in a weight log associating the weight reading with a user profile; and display the weight reading on a screen of the electronic mobile device.

5. The smart scale system of claim 4 wherein the wireless communication module comprises a Bluetooth or Bluetooth Low Energy communication module.

6. The smart scale system of claim 5 wherein the weighing platform is ovular and the two elevated sidewalls curve up from the cushioned surface.

7. The smart scale system of claim 6 wherein the cushioned upper element comprises foam and a waterproof or water resistant outer surface.

8. The smart scale system of claim 6 further comprising a safety restraint to secure a load atop the weighing platform.

9. The smart scale system of claim 5 wherein the application further causes the one or more processors to chart the weight readings in the weight log for the user profile over time.

10. The smart scale system of claim 5 wherein the application further causes the one or more processors to transmit the weight reading to a cloud data storage.

11. The smart scale system of claim 5 wherein the application further causes the one or more processors to trigger an alert message to a second electronic mobile device.

12. The smart scale system of claim 5 wherein the smart scale system includes a nursing function that comprises:

determining a first weight reading before nursing an infant;

determining a second weight reading after nursing the infant;

calculating the difference to determine the feed weight of liquid consumed by the infant; and displaying the feed weight on the screen of the electronic mobile device.

13. The smart scale system of claim 12 wherein the application further causes the one or more processors to calculate the liquid volume consumed by the infant and to display the liquid volume consumed on the screen of the electronic mobile device.

14. The smart scale system of claim 12 wherein the application further causes the one or more processors to trigger an alert message including the feed weight to a second electronic mobile device.

15. The smart scale system of claim 5 wherein the smart scale system includes a changing function that comprises:

determining a first weight reading before changing an infant's diaper;

determining a second weight reading after changing the infant's diaper;

calculating the difference to determine the waste weight in the diaper; and displaying the waste weight on the screen of the electronic mobile device.

16. The smart scale system of claim 14 wherein the application further causes the one or more processors to enable a user to note if the diaper associated with the waste weight included urine, feces, or both.

17. The smart scale system of claim 4, wherein the smart scale system further comprises a tare function to zero out the weight on the scale.

18. The smart scale system of claim 4, wherein the application further comprises displaying a historical graph showing the weight readings over time.

19. The smart scale system of claim 4, wherein the application further comprises associating a length log with the user profile and recording length entries over time in the length log.

20. The smart scale system of claim 4, wherein the smart scale system further comprises enabling a user to associate a photo of the baby with the user profile.

* * * * *